Jan. 13, 1931.  C. SCHWARZ  1,789,084
WHEEL
Filed April 18, 1927
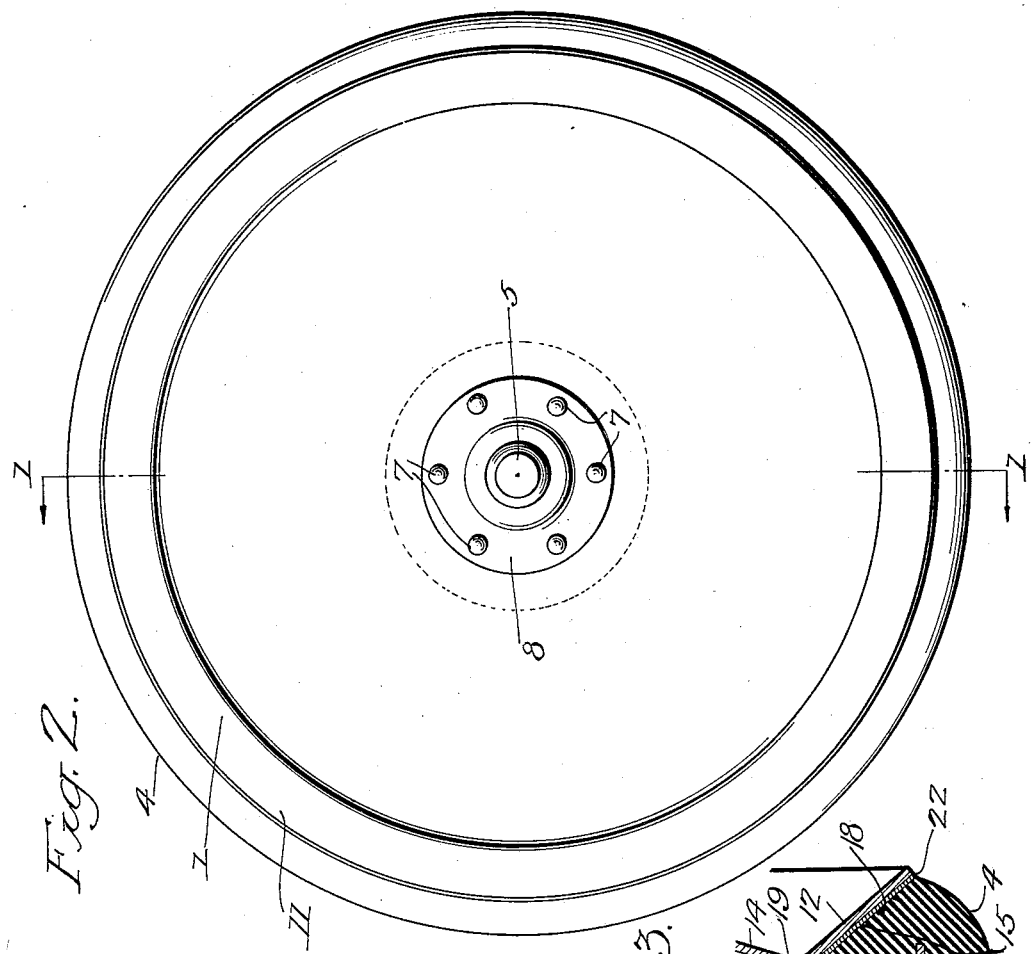
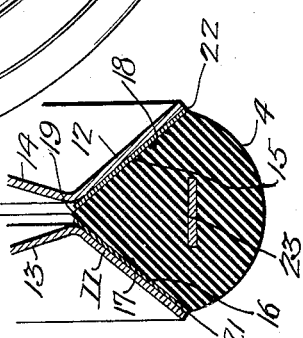
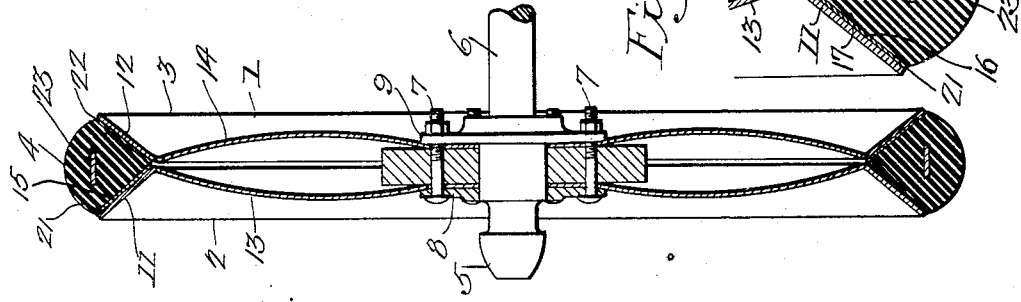
Inventor.—
Carl Schwarz.
by their Attorneys
Howson & Howson Patented Jan. 13, 1931

1,789,084

UNITED STATES PATENT OFFICE

CARL SCHWARZ, OF PHILADELPHIA, PENNSYLVANIA, ASSIGNOR OF ONE-HALF TO FRANK A. DUCKETT, OF PHILADELPHIA, PENNSYLVANIA

WHEEL

Application filed April 18, 1927. Serial No. 184,651.

My invention relates to wheels, and it has for one object the provision of a wheel of simple and efficient construction characterized not only by its strength, but also by the fact that sudden shocks are absorbed in the wheel and not transmitted to the wheel shaft, thus assuring the shaft a cushion support.

Another object of my invention is to provide a wheel wherein the peripheral portions of plates constituting the sides of the wheel are relatively movable so as to afford a tire an expansible seat.

A further object of my invention is to provide a wheel comprising a pair of disks having separable peripheral portions and intermediate portions formed to permit the flexing of said peripheral portions, so that the latter may serve as a resilient seat for a tire.

Other objects and applications of my invention, as well as details of construction and operation, whereby the same may be practiced, will be apparent more fully hereinafter, when taken in connection with the accompanying drawings, wherein Fig. 1 is a transverse sectional view of an embodiment of my invention, the sectional plane being taken on the line I—I of Fig. 2;

Fig. 2 is a side elevational view of the structure of Fig. 1; and

Fig. 3 is an enlarged detail sectional view of the tire and associated supporting flanges.

Referring to the drawing, a wheel 1 comprises broadly a pair of circular plates or disks 2 and 3, a tire 4 and a hub 5 which affords a shaft 6 an antifriction support. The hub 5, which is of conventional design, is rigidly secured by bolts 7 to central portions 8 and 9 of the wheel disks 2 and 3, respectively.

According to my invention, the central portions 8 and 9 only of the disks 2 and 3 are rigidly secured together, peripheral portions 11 and 12 being relatively movable and adapted to flex about intermediate, outwardly dished, circular portions 13 and 14 of the disks 2 and 3, respectively. The peripheral portions 11 and 12 are shown as outwardly flared flanges constituting sides of a circular groove 15 which is wedge shape in cross section. These flanges together constitute a resilient expansible seat 16 for a tire 4. Sides 17 and 18 of the tire 4 are beveled complementary to the peripheral flanges 11 and 12, respectively, and co-act therewith. The sides 17 and 18 of the tire 15 may be extended inwardly beyond the flanges 11 and 12 and terminate in an inner edge 19.

When a force is applied to the tire 4 so as to cause a radial inward movement or deformation of the portion subject to the force, the immediately adjacent portions of the peripheral flanges 11 and 12 separate, flexing or bending about the intermediate circular portions 13 and 14, respectively. As a result of the inward movement of the compressed portion of the tire 4 and the flexing of the peripheral flanges 11 and 12 with respect to the inner plate portions 13 and 14, the wheel 1 absorbs the shock or force without transmitting the same to the shaft 6. When the force on the tire 4 is released, the peripheral flanges 11 and 12 spring together into their original position, forcing the deformed portion of the tire also into its normal position. Thus the tire 4 is afforded not only an expansible seat but also a resilient seat and, as a result, the shaft 6 is provided with a cushion mounting.

Movement of the deformed portion of the tire 4 over the flanges 11 and 12 may be facilitated by securing a pair of plates 21 and 22 to the respective co-acting sides 17 and 18 of the tire 4. Moreover, should there be a tendency for the deformed portion of the tire 4 to lodge in the narrow portion of the wedge-shaped groove 15, this undesirable result may be prevented by reinforcing the tire 4 with a spring strip 23 imbedded therein, the strength of the strip 23 being sufficient to limit the inward movement of the tire 4 when deformed under the affect of a shock.

While I have shown only one form of embodiment of my invention, for the purpose of describing the same and illustrating its principles of construction and operation, it is apparent that various changes and modifications may be made therein without departing from the spirit of my invention.

I claim:

A wheel comprising a hub, a pair of disks constituting the sides of said wheel having central portions thereof rigidly secured to said hub but free peripheral portions, said disks also having circular dished portions intermediate said central and peripheral portions permitting the separation of said peripheral portions, the latter being formed to constitute a seat of wedge shape, a tire positioned in said seat and a resilient reinforcing element imbedded in said tire.

CARL SCHWARZ.